United States Patent
He et al.

(10) Patent No.: US 9,264,277 B2
(45) Date of Patent: Feb. 16, 2016

(54) APPARATUS AND METHOD FOR DETECTING NULL SYMBOLS

(75) Inventors: Wei-Hung He, Taipei Hsien (TW); Chin-Tai Chen, Tao-Yuan Hsien (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 1037 days.

(21) Appl. No.: 12/017,836

(22) Filed: Jan. 22, 2008

(65) Prior Publication Data

US 2008/0175338 A1    Jul. 24, 2008

(30) Foreign Application Priority Data

Jan. 24, 2007 (TW) ............................... 96102659 A

(51) Int. Cl.
*H04L 27/06* (2006.01)
*H04L 27/26* (2006.01)

(52) U.S. Cl.
CPC ........ *H04L 27/2656* (2013.01); *H04L 27/2676* (2013.01); *H04L 27/2662* (2013.01)

(58) Field of Classification Search
CPC ............ H04L 27/2656; H04L 27/2662; H04L 27/2676
USPC .................. 375/224, 316, 340, 343, 259, 260
See application file for complete search history.

(56) References Cited

U.S. PATENT DOCUMENTS

| | | | | |
|---|---|---|---|---|
| 5,374,995 A * | 12/1994 | Loveridge et al. | ............ | 358/447 |
| 6,392,584 B1 * | 5/2002 | Eklund | .......................... | 341/183 |
| 6,731,702 B1 * | 5/2004 | Nomura | ........................ | 375/343 |
| 7,006,577 B2 * | 2/2006 | Kim | .............................. | 375/260 |
| 7,065,171 B1 | 6/2006 | Hilborn et al. | | |
| 7,339,988 B1 * | 3/2008 | Shanbhag et al. | ............ | 375/232 |
| 2005/0013353 A1 * | 1/2005 | Alloin | ........................... | 375/222 |
| 2006/0126204 A1 * | 6/2006 | Taniguchi et al. | .............. | 360/31 |

FOREIGN PATENT DOCUMENTS

EP          1850517 A1 * 10/2007

* cited by examiner

*Primary Examiner* — Kevin M Burd
(74) *Attorney, Agent, or Firm* — McClure, Qualey & Rodack, LLP

(57) ABSTRACT

An apparatus for detecting a null symbol of an input signal includes: a first circuit for processing the input signal to obtain a first output signal, the first output signal being used to track the influence of a channel phenomenon; a second circuit for processing the input signal to obtain a second output signal, the second output signal being used to track the null symbol in the input signal; and a determining circuit coupled to the first circuit and the second circuit and determining the null symbol of the input signal according to the first output signal and the second output signal. A method for detecting a null symbol of an input signal is also disclosed.

19 Claims, 3 Drawing Sheets

APPARATUS AND METHOD FOR DETECTING NULL SYMBOLS

CROSS-REFERENCE TO RELATED APPLICATION

This application claims priority of Taiwanese Application No. 096102659, filed on Jan. 24, 2007.

BACKGROUND OF THE INVENTION

1. Field of the Invention

The present invention relates to an apparatus and method for detecting a null symbol. More particularly, the present invention relates to an apparatus and method for detecting a null symbol in an input signal of, for example, a digital audio broadcasting system.

2. Description of the Related Art

Referring to FIG. 1, a digital audio broadcasting (DAB) signal includes a plurality of frames. As shown in FIG. 2, each of the frames includes two types of reference symbols and a plurality of data symbols. The first type of reference symbol is a null symbol that is used in frame synchronization, has a strength of zero, and is typically positioned at a frontmost end of a frame. The second type of reference symbol is a phase reference symbol.

Referring to Table 1 below, a DAB system supports four different transmission modes. A length of the null symbol in each frame is different in these modes.

TABLE 1

|  | Mode 1 | Mode 2 | Mode 3 | Mode 4 |
| --- | --- | --- | --- | --- |
| Null symbol Length | 1.297 ms | 324 µs | 168 µs | 648 µs |

A receiving end in the DAB system must determine a starting point of all the frames in a received signal (that is, a starting point of a null symbol), and must further determine which of the four modes the signal is in.

U.S. Pat. No. 7,006,577 discloses an apparatus for detecting a transmission mode using null symbol length which is determined by detecting the starting and end points of a null symbol. This conventional apparatus includes a first window buffer and a second window buffer that store square values of samples for the first and the second search periods, respectively. However, since the apparatus of U.S. Pat. No. 7,006,577 requires two window buffers, the apparatus occupies significant system resources and cannot perform real-time processing.

U.S. Pat. No. 6,731,702 and U.S. Pat. No. 7,065,171 disclose related conventional methods. However, these two methods are unable to determine the transmission mode of signals, and a receiving end must know in advance the transmission mode of the signals, and the lengths of a null symbol and a frame in order to determine a starting point of a null symbol. Therefore, these methods are impractical in actual use.

Another important consideration in DAB systems is that related to fading of a received signal. In particular, if a receiving end in a DAB system is installed on a vehicle, a fading phenomenon may occur in a channel between a transmission end and the receiving end, particularly when the vehicle is traveling at a high speed. Therefore, when detecting a null symbol, this phenomenon must be taken into consideration so as to prevent the erroneous detection of null symbols.

SUMMARY OF THE INVENTION

Therefore, the object of this invention is to provide an apparatus and method for detecting a null symbol of an input signal, in which it is unnecessary to know beforehand a signal transmission mode.

It is another object of this invention to provide an apparatus and method for detecting a null symbol of an input signal that may be effectively used in environments where channel fading may be occurring. According to one aspect, the apparatus of this invention is adapted for detecting a null symbol in an input signal. The apparatus comprises: a first circuit for processing the input signal to obtain a first output signal, the first output signal being used to track the influence of a channel phenomenon; a second circuit for processing the input signal to obtain a second output signal, the second output signal being used to track the null symbol in the input signal; and a determining circuit coupled to the first circuit and the second circuit and determining the null symbol of the input signal according to the first output signal and the second output signal.

According to another aspect of this invention, the method for detecting a null symbol of an input signal comprises: generating a first output signal by processing the input signal, wherein the first output signal is used to track the influence of a channel phenomenon; generating a second output signal by processing the input signal, wherein the second output signal is used to track the null symbol in the input signal; and determining the null symbol of the input signal according to the first output signal and the second output signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

An apparatus according to a preferred embodiment of the present invention is adapted to be disposed on a receiving device (not shown), and is further adapted for detecting a null symbol in an input signal. The receiving device first converts a received analog signal into a digital signal, and inputs the digital signal into the apparatus for detecting a null symbol of the present invention.

Figure 1:
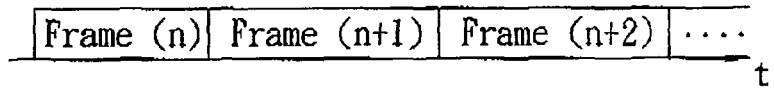
FIG. 1 is a schematic view, illustrating a plurality of frames in a DAB signal.
Figure 2:
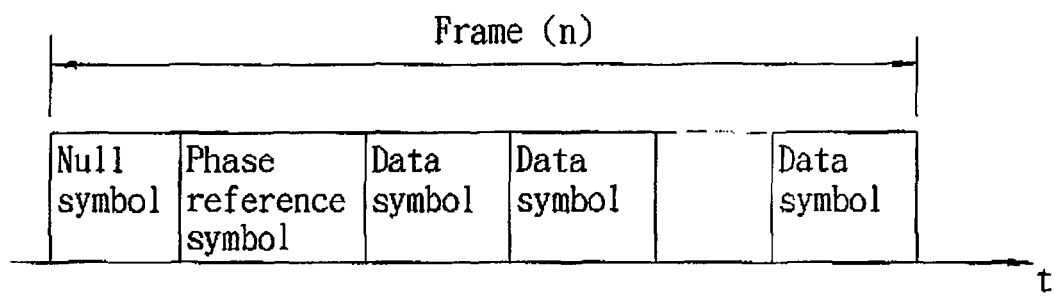
FIG. 2 is a schematic view, illustrating the structure of each of the frames of the DAB signal of FIG. 1.
Figure 3:
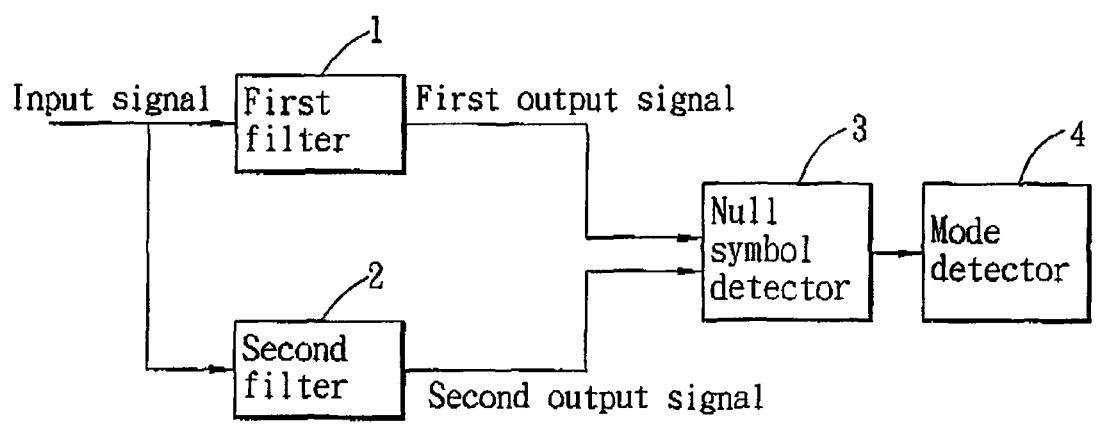
FIG. 3 is a block diagram of an apparatus for detecting a null symbol according to a preferred embodiment of the present invention.

Referring to FIG. 3, the apparatus for detecting a null symbol according to the preferred embodiment of the present invention includes a first filter 1, a second filter 2, a null symbol detector 3, and a mode detector 4.

The digital signal from the receiving device is input to the first filter 1. The first filter 1 filters the input signal to obtain a first output signal. In the preferred embodiment, the relation between the input signal and the first output signal may be expressed by the following equation:

$$y_1(n) = y_1(n-1) \cdot (1-\alpha_1) + p(n) \cdot \alpha_1 \quad \text{Equation (1)}$$

where p(n) is a value of an index of the input signal at n, $y_1(n)$ is a value of an index of the first output signal at n, $y_1(n-1)$ is a value of the index of the first output signal at n−1, and $\alpha_1$ is a first weighted value.

The digital signal from the receiving device is also input to the second filter 2. The second filter 2 filters the input signal to obtain a second output signal. In the preferred embodiment, the relation between the input signal and the second output signal may be expressed by the following equation:

$$y_2(n) = y_2(n-1) \cdot (1-\alpha_2) + p(n) \cdot \alpha_2 \quad \text{Equation (2)}$$

where $y_2(n)$ is a value of an index of the second output signal at n, $y_2(n-1)$ is a value of the index of the second output signal at n−1, and $\alpha_2$ is a second weighted value.

When the apparatus of the present invention is disposed on a moving receiving end (e.g., a vehicle), channel fading may occur. Therefore, selection of the first weighted value is related to vehicle speed. If a high vehicle speed is expected, then a large first weighted value must be employed. Also, the first weighted value must be large enough to allow the first output signal to track the influence of channel fading, but not so large as to cause the first output signal to quickly track appearance of the null symbol in the input signal. For example, when the vehicle speed is approximately 150 Km/h, the first weighted value may be $2^{-11}$, and when the vehicle speed is approximately 300 Km/h, the first weighted value may be $2^{-10}$.

Further, the second weighted value must be large enough to cause the second output signal to quickly track appearance of the null symbol in the input signal. Since Mode 3 has the shortest null symbol length, the second weighted value must be large enough to allow the second output signal to quickly track appearance of the null symbol of Mode 3. In this embodiment, the second weighted value may be $2^{-8}$.

In this embodiment, the first output signal is used for tracking the influence of a channel phenomenon (channel fading in the preferred embodiment), and the second output signal is used for quickly tracking the null symbol in the input signal. Therefore, the first weighted value is smaller than the second weighted value.

Figure 4A:
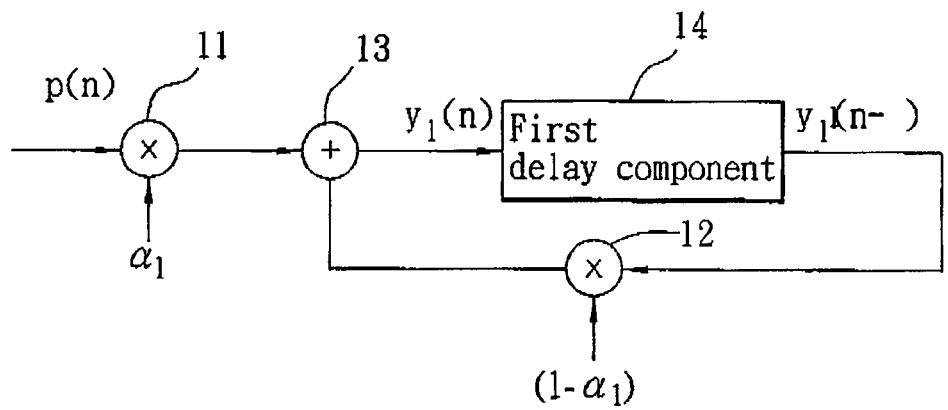
FIGS. 4A and 4B are diagrams respectively of a first filter and a second filter of the preferred embodiment.
Figure 4B:
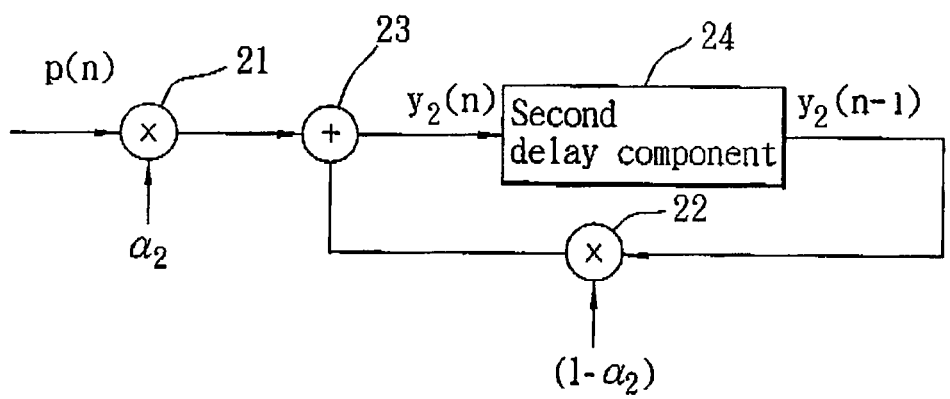

FIGS. 4A and 4B respectively show exemplary configurations of the first and second filters 1, 2 in more detail. However, the present invention is not limited to the configurations shown in FIGS. 4A and 4B, and it is necessary only that the first and second filters 1, 2 be low-pass filters that can perform a smoothing function or an average function for the input signal. For example, each of the first and second filters 1, 2 may be an infinite-duration impulse response (IIR) filter. In addition, cutoff frequencies of the first and second filters 1, 2 may be varied to adjust the first and second weighted values. Since the first and second weighted values are different as described above, the first and second filters 1, 2 have different cutoff frequencies. It is to be noted that the first filter 1 and the second filter 2 may also be implemented by software.

As may be apparent from Equation 1, the first filter 1 includes two multipliers, an adder, and a delay component. In particular, with reference to FIG. 4A, the first filter 1 includes a first multiplier 11, a second multiplier 12, a first adder 13, and a first delay component 14. The connections among these elements are shown in FIG. 4A. Similarly, the structure of the second filter 2 may be apparent from Equation 2. Particularly, with reference to FIG. 4B, the second filter 2 includes a third multiplier 21, a fourth multiplier 22, a second adder 23, and a second delay component 24.

Referring back to FIG. 3, the null symbol detector 3 receives the first output signal of the first filter 1 and the second output signal of the second filter 2, and determines a location of a null symbol according to the first and second output signals. A length of the null symbol and a length of a frame may also be determined in accordance with the first and second output signals.

Since the first output signal is used to track channel fading and the second output signal is used to track the null symbol in the input signal, two points at which waveforms of the first output signal and the second output signal intersect may be interpreted to indicate starting and end points of the null symbol. The null symbol detector 3 may be realized through a subtractor (not shown) or a comparator (not shown).

Figure 5:
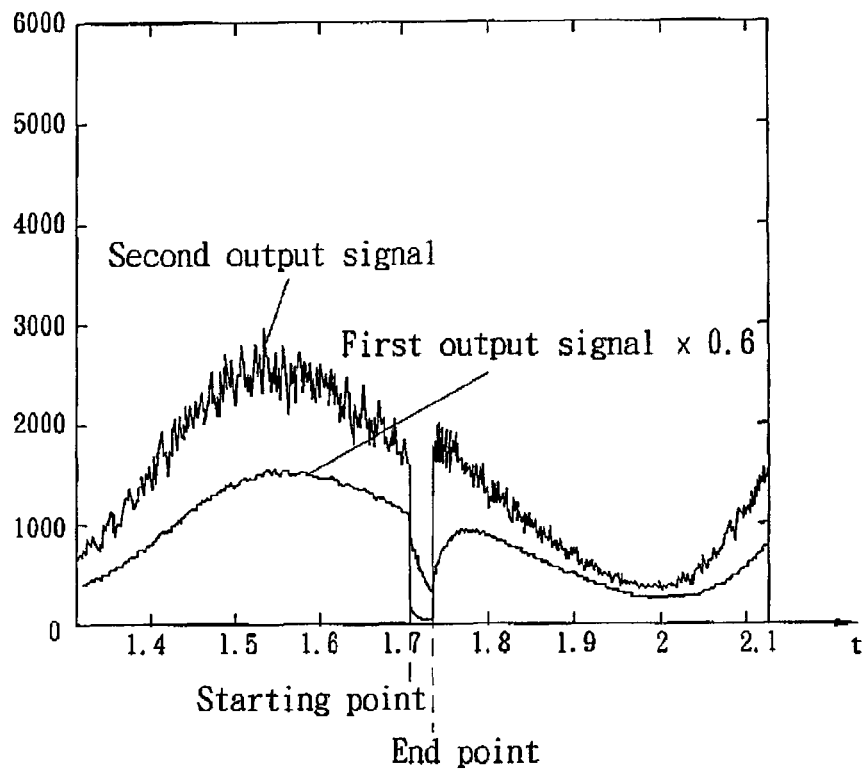
FIG. 5 is a plot of a first output signal and a second output signal, illustrating how waveforms of the first and second output signals may be used to determine starting and end points of a null symbol.

In the preferred embodiment, the null symbol detector 3 includes a multiplier (not shown) and a subtractor (not shown). Referring to FIG. 5, the null symbol detector 3 compares the second output signal with a product of the first output signal and a first ratio value to determine the starting point of the null symbol. For example, the null symbol detector 3 detects a point in time at which the second output signal becomes smaller than the product of the first output signal and the first ratio value, and sets this point in time as the starting point of the null symbol.

After the null symbol has been detected, that is, after the starting point of the null symbol has been detected, the null symbol detector 3 subsequently compares the second output signal with a product of the first output signal and a second ratio value to determine the end point of the is null symbol. For example, following the above detection of the starting point of the null symbol, the null symbol detector 3 detects a point in time at which the second output signal becomes larger than the product of the first output signal and the second ratio value, and sets this point in time as the end point of the null symbol. FIG. 5 illustrates the case where the starting and endpoints of the null symbol are detected when the first and second ratio values are set as 0.6.

Preferably, the second ratio value is set to be slightly larger than the first ratio value to prevent errors due to noise interference. For example, the first ratio value may be set as 0.6 and the second ratio value as 0.7. However, the present invention is not limited with respect to precise numerical values used for the first and second ratio values.

After detecting the starting and end points of the null symbol, the null symbol detector 3 is able to calculate the length of the null symbol. In one embodiment, the null symbol detector 3 includes two counters (not shown), one of which is used to count the length of the null symbol and the other of which is used to count the length of the frame.

Referring back again to FIG. 3, the mode detector 4 determines the transmission mode of the signal on the basis of the length of the null symbol determined by the null symbol detector 3 and on the basis of Table 1.

Figure 6:
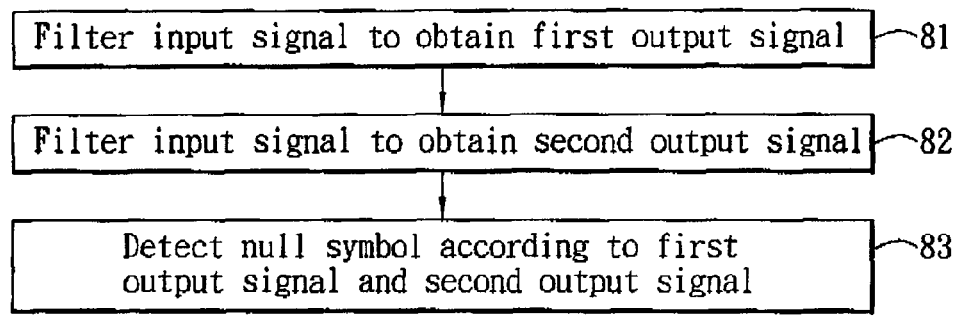
FIG. 6 is a flow chart of method for detecting a null symbol according to a preferred embodiment of the present invention.

Referring to FIG. 6, a method for detecting a null symbol in an input signal according to a preferred embodiment of the present invention will now be described.

First, in step 81, an input signal is filtered to obtain a first output signal. The first output signal is able to track the influence of a channel phenomenon, i.e., the influence of channel fading.

In step 82, the input signal is filtered to obtain a second output signal. The second output signal is able to quickly track appearance of the null symbol in the input signal. That is, the second output signal is able to track an average strength of the input signal so that null symbol tracking is possible.

In step 83, the null symbol is detected according to the first output signal and the second output signal.

In the present invention described hereinabove, it is unnecessary to know beforehand the transmission mode used by an input signal or lengths of the null symbol and frame in order to detect the starting point of a frame (i.e., the starting point of the null symbol), the length of the null symbol, and the transmission mode. Further, by taking into consideration the influence of channel fading, the present invention may be effectively used in environments where channel fading may occur (e.g., where the receiving end is associated with a moving vehicle).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An apparatus for detecting a first symbol of an input signal, said apparatus comprising:
    a first low-pass filter for processing the input signal and obtaining a first output signal, the first low-pass filter comprising a variable cut-off frequency and a first weighted value corresponding to an ability of the first output signal to track channel fading;
    a second low-pass filter for processing the input signal and obtaining a second output signal, the second low-pass filter comprising a variable cut-off frequency and a second weighted value corresponding to an ability to track the first symbol of the input signal; and
    a determining circuit, coupled to said first low-pass filter and said second low-pass filter, and determining the first symbol of the input signal according to the first output signal and the second output signal, wherein said determining circuit determines the first symbol by detecting two intersections of waveforms corresponds to the first and second output signals and interpreting the two intersections as starting and ending points of the first symbol.

2. The apparatus of claim 1, wherein the second output signal is used to track an average strength of the input signal.

3. The apparatus of claim 1, wherein said first low-pass filter and said second low-pass filter have different cutoff frequencies.

4. The apparatus of claim 1, wherein said determining circuit determines the first symbol by:
    determining a starting point of the first symbol by comparing the second output signal with a product of the first output signal and a first ratio value; and
    determining an ending point of the first symbol by comparing the second output signal with a product of the first output signal and a second ratio value, wherein the first and second ratio values are adjustable.

5. The apparatus of claim 4, wherein said determining circuit determines a length of the first symbol based on the starting point and the ending point.

6. The apparatus of claim 5, further comprising a mode detector for determining a transmission mode of the input signal according to the determined length and a data structure comprising a plurality of first symbol lengths and a respective plurality of transmission modes.

7. The apparatus of claim 1, wherein the input signal comprises a digital audio broadcasting (DAB) signal, and the first symbol is a null symbol.

8. A method for detecting a first symbol of an input signal, comprising:
    generating a first output signal by processing the input signal using a first low-pass filter, the first low-pass filter comprising a variable cut-off frequency and a first weighted value corresponding to an ability of the first output signal to track channel fading;
    generating a second output signal by processing the input signal using a second low-pass filter, the second low-pass filter comprising a variable cut-off frequency and a second weighted value corresponding to an ability to track the first symbol in the input signal; and
    determining the first symbol of the input signal according to the first output signal and the second output signal, wherein determining the first symbol comprises detecting two intersections of waveforms corresponds to the first and second output signals and interpreting the two intersections as starting and ending points of the first symbol.

9. The method of claim 8, wherein the second output signal is used to track an average strength of the input signal.

10. The method of claim 8, further comprising adjusting the second weighted value according to a larger value than adjusting the first weighted value.

11. The method of claim 10, wherein the adjusting of the first and second weighted values improves the ability of the second output signal to track the first symbol over the ability of the first output signal to track the first symbol.

12. The method of claim 8, wherein the step of determining the first symbol further comprises:
    determining a starting point of the first symbol by comparing the second output signal with a product of the first output signal and a first ratio value; and
    determining an ending point of the first symbol by comparing the second output signal with a product of the first output signal and a second ratio value, wherein the first and second ratio values are adjustable.

13. The method of claim 12, further comprising:
    determining a length of the first symbol based on the starting point and the ending point.

14. The method of claim 13, further comprising;
    determining a transmission mode of the input signal according to the determined length and a data structure comprising a plurality of first symbol lengths and a respective plurality of transmission modes.

15. An apparatus for detecting a first symbol of an input signal, said apparatus comprising:
    a first low-pass filter for processing the input signal and obtaining a first output signal, the first low-pass filter comprising a variable cut-off frequency and a first weighted value corresponding to an ability of the first output signal to track channel fading, the first low-pass filter further comprising:
        a first multiplier for receiving the first weighted value and the input signal;
        a first adder for receiving an output of the first multiplier and providing an index of the input signal;
        a first delay component for receiving the index and providing an output; and
        a second multiplier for receiving the output of the first delay component and a value corresponding to the first weighted value and providing an output to the first adder;
    a second low-pass filter for processing the input signal and obtaining a second output signal, the second low-pass filter comprising a variable cut-off frequency and a second weighted value corresponding to an ability to track the first symbol of the input signal, the second low-pass filter further comprising:
  a third multiplier for receiving the second weighted value and the input signal;
  a second adder for receiving an output of the third multiplier and providing an index of the input signal;
  a second delay component for receiving the index and providing an output; and
  a fourth multiplier for receiving the output of the second delay component and a value corresponding to the second weighted value and providing an output to the second adder; and
a determining circuit, coupled to said first low-pass filter and said second low-pass filter, and determining the first symbol of the input signal according to the first output signal and the second output signal, wherein the input signal comprises a digital audio broadcasting (DAB) signal, and the first symbol is a null symbol, wherein said determining circuit determines the first symbol by detecting two intersections of waveforms corresponds to the first and second output signals and interpreting the two intersections as starting and ending points of the first symbol.

16. The apparatus of claim 15, wherein said first low-pass filter and said second low-pass filter have different cutoff frequencies.

17. The apparatus of claim 15, wherein said determining circuit determines the first symbol by:
  determining a starting point of the first symbol by comparing the second output signal with a product of the first output signal and a first ratio value; and
  determining an ending point of the first symbol by comparing the second output signal with a product of the first output signal and a second ratio value, wherein the first and second ratio values are adjustable.

18. The apparatus of claim 17, wherein said determining circuit determines a length of the first symbol based on the starting point and the ending point.

19. The apparatus of claim 18, further comprising a mode detector for determining a transmission mode of the input signal according to the determined length and a data structure comprising a plurality of first symbol lengths and a respective plurality of transmission modes.

* * * * *